No. 774,246. Patented November 8, 1904.

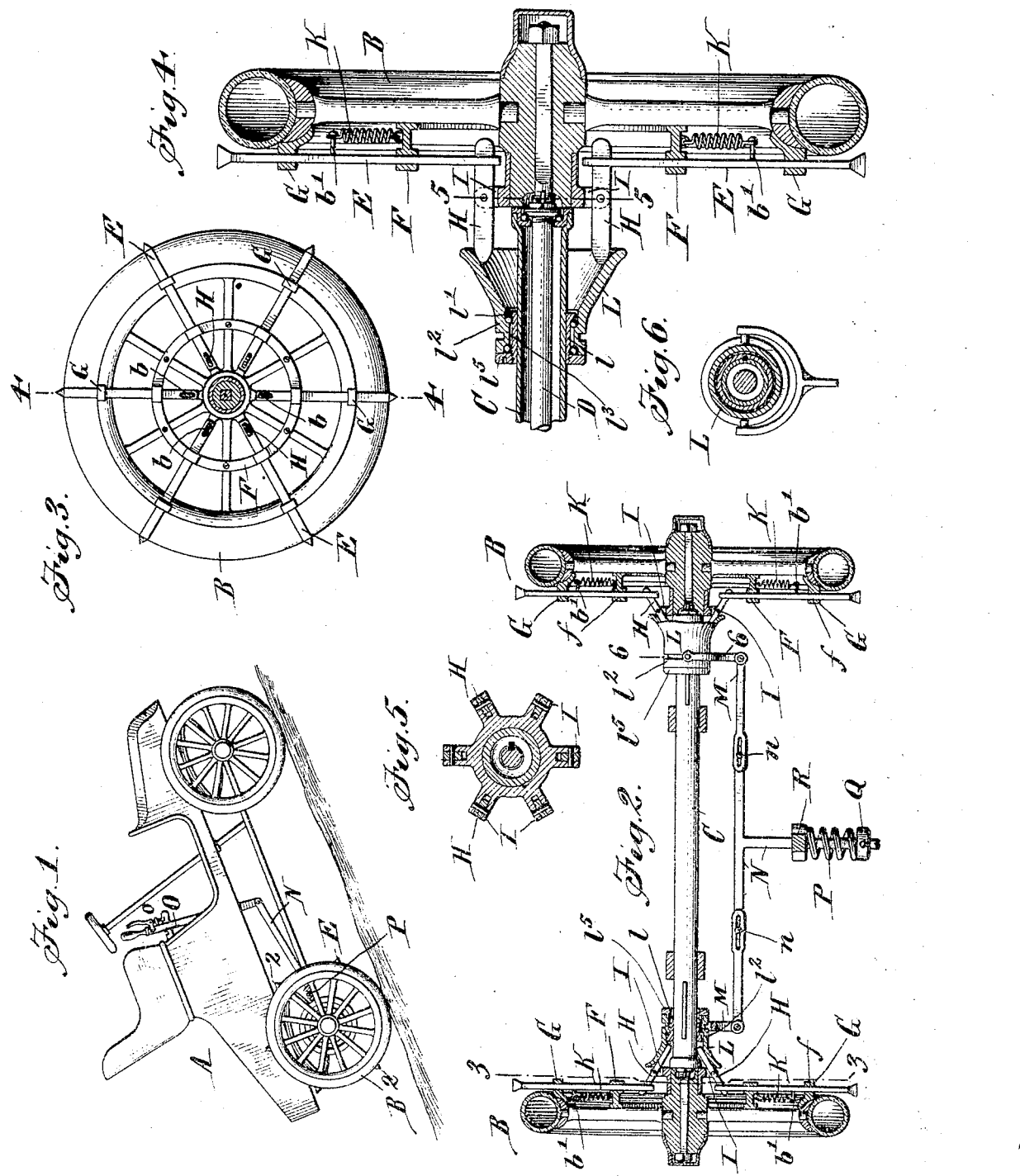

UNITED STATES PATENT OFFICE.

ALEXIS W. HERRICK, OF BUFFALO, NEW YORK, ASSIGNOR OF ONE-HALF TO WILLIE W. CLARK, OF BUFFALO, NEW YORK.

TRACTION ATTACHMENT FOR VEHICLES.

SPECIFICATION forming part of Letters Patent No. 774,246, dated November 8, 1904.

Application filed July 13, 1904. Serial No. 216,348. (No model.)

*To all whom it may concern:*

Be it known that I, ALEXIS W. HERRICK, a citizen of the United States, residing at Buffalo, in the county of Erie and State of New York, have invented certain new and useful Improvements in Traction Attachments for Vehicles, of which the following is a specification.

This invention relates to vehicles, and more particularly to the traction elements thereof. Its object is to provide an attachment whereby the traction of a vehicle may be increased when desired, as when going uphill or traveling on slippery roads.

It consists, broadly, in the combination, with the vehicle-wheel and a radial series of spurs or prongs, of means for simultaneously projecting these spurs beyond the periphery of the wheel and rigidly holding them in their exposed positions. I also contemplate employing means whereby the spurs may be simultaneously retracted.

The invention further comprises the various details of construction shown as embodying the principle.

In the drawings, Figure 1 represents a side view of an automobile provided with the traction attachment. Fig. 2 is a section taken on line 2 2, Fig. 1, with the forward end of the T-rod broken away. Fig. 3 is a vertical section taken on line 3 3, Fig. 2, showing one of the driving-wheels and its spurs in elevation. Fig. 4 is an enlarged vertical section taken on line 4 4, Fig. 3. Fig. 5 is a vertical section taken on line 5 5, Fig. 4. Fig. 6 is an enlarged section taken on line 6 6, Fig. 2.

A represents the vehicle as a whole, in this instance an automobile; but it is to be understood that this attachment may be applied to other styles of vehicles, though it is particularly intended for use with the driving-wheels of motor-cars.

C represents the usual hollow axle of automobiles, which incloses the driving-shaft D.

B is one of the driving-wheels, and E is one of a series of spurs or prongs which are slidably mounted on one side of the driving-wheel, preferably the inner side. These spurs are of any desired construction and are suitably guided in brackets projecting from the inner face of the wheel. As illustrated, these brackets comprise an inner rim F, secured to the spokes and provided with radial apertures *f*, and lugs G, suitably secured to the outer rim and provided with radial apertures which aline with the apertures of the inner rim. The inner ends of the spurs are provided with transverse slots *b*, which receive the outer ends of straight levers H, which are pivoted intermediate their length between pairs of radial lugs I on the inner end of the wheel-hub. Levers H thus form a circular series of parallel members, the compression of whose inner end is adapted to project the outer ends of the spurs beyond the periphery of the wheel. Means for simultaneously retracting the spurs is provided in the form of coil-springs K, secured at opposite ends to the inner rim F, and pins *b'*, projecting from the spurs.

I will now describe the means for simultaneously operating levers H of both driving-wheels and for rigidly holding the spurs in their exposed positions.

Splined to axle C adjacent the two wheels are slidable hollow cones L, whose flaring ends are adapted to receive the inner ends of levers H. A bell-crank lever M is secured at one end to each of the cones, and the free ends of these bell-cranks are connected by a T-rod N, whose ends are provided with studs *n*, working in slots in the ends of the bell-cranks. T-rod N is operated by a hand-lever O, standing within the body of the car, and when the T-rod is shoved backward it is obvious that the outer ends of the bell-cranks are spread apart, carrying the cones toward levers H, thereby simultaneously projecting the spurs. The T-rod is restored to its normal position by means of a spring coil-spring P, lying between a collar Q, rigidly mounted on the rod, and a projection R of the vehicle-body. A quadrant *o* locks the hand-lever at any desired point.

In order to prevent friction by the rotation of the inner ends of levers H within the cones, the latter are preferably formed in two parts. The inner member *l* is splined to the stationary axle and comprises a sleeve having an outer flange $l'$. The outer member $l^2$, or cone proper, is provided with annular inner shoulders $l^3$ for the reception of ball-bearings $l^4$, which are retained by means of the flange $l'$, and a locking-ring $l^5$, which is screwed onto the inner end of member $l$. Thus when the cone compresses the inner ends of levers H the outer cone member is free to rotate with the wheel and spurs.

What is claimed as new is—

1. The combination with a vehicle-wheel, and a radial series of prongs having their outer ends normally within the periphery of the wheel; of means for simultaneously projecting said prongs outside the periphery of the wheel and rigidly holding them in their exposed positions comprising a cone laterally adjustable with reference to the inner ends of the prongs.

2. The combination with a vehicle-wheel, and a radial series of prongs having their outer ends normally within the periphery of the wheel; of levers engaging with the inner ends of the prongs, and an adjustable cone engaging with the ends of said levers.

3. The combination with a vehicle-wheel, and a radial series of prongs adjacent the wheel, their inner ends being provided with transverse slots; of a circular series of parallel levers pivoted intermediate their lengths, their outer ends standing within the slots in the prongs, and an adjustable cone for actuating the inner ends of said levers.

4. The combination with a vehicle-wheel, and a radial series of prongs adjacent the wheel; of a circular series of parallel levers pivoted intermediate their lengths, their outer ends engaging with the inner ends of the prongs, and an adjustable hollow cone whose flaring end is adapted to receive the inner ends of the levers.

5. In a vehicle, the combination with the axle, and the wheel mounted at the end thereof; of a series of brackets on said wheel having radial apertures, prongs mounted slidably therein, levers pivoted on the wheel-hub and engaging with the inner ends of the prongs, and a slidable cone mounted on the axle for actuating said levers.

6. In a vehicle, the combination with the axle, and the driving-wheels mounted thereon; of a radial series of prongs mounted on each wheel, a set of levers engaging with the inner ends of each series of prongs, slidable cones mounted on the axle to engage with said levers, and means for simultaneously actuating said cones, comprising bell-crank levers each connected at one end to one of the cones, their other ends being slotted, a T-rod connecting said slotted ends, and means for actuating the T-rod.

7. In a vehicle, the combination with the axle, the wheel mounted at the end thereof, a radial series of prongs adjacent the wheel, and a series of levers engaging the prongs; of a two-part cone for actuating said levers, one part being mounted on the axle, the other part being rotatably carried by the first part.

8. In a vehicle, the combination with the stationary axle, the driving-wheel mounted at the end thereof, a radial series of prongs adjacent the wheel, and a series of levers engaging the prongs; of a two-part cone for actuating said levers, one part being splined to the axle, the other part being rotatably carried by the first part.

9. In a vehicle, the combination with the axle, the wheel mounted at the end thereof, a radial series of prongs adjacent the wheel, and a series of levers engaging the prongs; of means for actuating said levers comprising a sleeve slidably mounted on the axle, a hollow cone member rotatably mounted on said sleeve, and antifriction elements between the sleeve and cone member.

10. In a vehicle, the combination with the axle, the wheel mounted at the end thereof, a radial series of prongs adjacent the wheel, and a series of levers engaging the prongs; of means for actuating said levers, comprising a sleeve slidably mounted on the axle and having a flange at one end, a locking-ring removably secured to the other end of the sleeve, and a hollow cone member rotatably mounted between the flange and ring.

11. The combination with a vehicle-wheel, and a radial series of prongs having their outer ends normally within the periphery of the wheel; of means for simultaneously projecting said prongs outside the periphery of the wheel and rigidly holding them in their exposed positions, and means comprising an element consisting of two parts, one part being splined to the axle, the other part being rotatably carried by the first part.

In witness whereof I have affixed my signature in the presence of two subscribing witnesses.

ALEXIS W. HERRICK.

Witnesses:
CHAS. F. BURKHART,
M. SERVERT.